United States Patent
Xu et al.

(10) Patent No.: US 10,194,454 B2
(45) Date of Patent: Jan. 29, 2019

(54) METHOD AND SYSTEM FOR IMPLEMENTING SERVICE SCHEDULING, BASE STATION, AND USER EQUIPMENT

(71) Applicant: ZTE CORPORATION, Shenzhen, Guangdong Province (CN)

(72) Inventors: Hui Xu, Shenzhen (CN); Zijiang Ma, Shenzhen (CN); Chen Lu, Shenzhen (CN); Yong Lv, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/550,365

(22) PCT Filed: Aug. 31, 2015

(86) PCT No.: PCT/CN2015/088651
§ 371 (c)(1),
(2) Date: Aug. 10, 2017

(87) PCT Pub. No.: WO2016/127626
PCT Pub. Date: Aug. 18, 2016

(65) Prior Publication Data
US 2018/0027578 A1 Jan. 25, 2018

(30) Foreign Application Priority Data
Feb. 13, 2015 (CN) .......................... 2015 1 0082663

(51) Int. Cl.
*H04W 72/12* (2009.01)
*H04L 1/00* (2006.01)
(Continued)

(52) U.S. Cl.
CPC ........... *H04W 72/1205* (2013.01); *H04L 1/00* (2013.01); *H04L 5/0053* (2013.01);
(Continued)

(58) Field of Classification Search
CPC ......... H04W 72/1205; H04W 72/1278; H04W 72/005; H04W 72/042; H04L 1/00;
(Continued)

(56) References Cited

U.S. PATENT DOCUMENTS

| | | | |
|---|---|---|---|
| 2009/0149164 A1* | 6/2009 | Cai | ...................... H04W 72/005 455/414.2 |
| 2011/0019648 A1* | 1/2011 | Huang | ................ H04W 72/005 370/332 |

(Continued)

FOREIGN PATENT DOCUMENTS

| | | | |
|---|---|---|---|
| CN | 102264032 A | 11/2011 | |
| CN | 102300333 A | 12/2011 | |

(Continued)

OTHER PUBLICATIONS

Baoju Zhang, Tianjin Normal University, et al., An Improved Blind Detection Method for PDCCH in TD-LTE System, The Proceedings of the Second International Conference on Communications, Signal Processing, and Systems, Oct. 24, 2013, pp. 711-712. XP55436366A.

(Continued)

*Primary Examiner* — Afshawn M Towfighi
(74) *Attorney, Agent, or Firm* — Ling Wu; Stephen Yang; Ling and Yang Intellectual Property

(57) ABSTRACT

Disclosed are a method, system, evolved Node B (eNB) and User Equipment (UE) for implementing service scheduling. The method includes: an eNB sends time-domain scheduling information of Single Cell-Point To Multipoint (SC-PTM) Multimedia Broadcast Multicast Service (MBMS) to a UE, the time-domain scheduling information is used for indicating a position of a time-domain subframe where the MBMS is located, and a Physical Downlink Control Channel (PDCCH) of the time-domain subframe includes frequency-domain scheduling information of the MBMS. A UE receives time-domain scheduling information, performs (Continued)

blind detection at a position of a time-domain subframe indicated by the time-domain scheduling information, determines a PDCCH including frequency-domain scheduling information of MBMS, and reads the frequency-domain scheduling information on the PDCCH. The UE receives the MBMS on a Physical Downlink Share Channel (PDSCH) on the basis of the read frequency-domain scheduling information.

15 Claims, 5 Drawing Sheets

(51) Int. Cl.
*H04L 5/00* (2006.01)
*H04W 72/00* (2009.01)
*H04W 72/04* (2009.01)

(52) U.S. Cl.
CPC .......... *H04L 5/0082* (2013.01); *H04L 5/0094* (2013.01); *H04W 72/005* (2013.01); *H04W 72/1278* (2013.01); *H04L 1/0002* (2013.01); *H04W 72/042* (2013.01)

(58) Field of Classification Search
CPC ... H04L 5/0082; H04L 5/0094; H04L 5/0053; H04L 1/0002
See application file for complete search history.

(56) References Cited

U.S. PATENT DOCUMENTS

| | | |
|---|---|---|
| 2011/0038299 A1 | 2/2011 | Sugawara et al. |
| 2012/0182921 A1* | 7/2012 | Tsuboi .................. H04W 4/021 370/312 |
| 2012/0294269 A1 | 11/2012 | Yamada et al. |

FOREIGN PATENT DOCUMENTS

| | | |
|---|---|---|
| CN | 102638897 A | 8/2012 |
| KR | 20140004321 A | 1/2014 |

OTHER PUBLICATIONS

Samsung, Downlink multicast on PDSCH, 3GPP TSG-RAN WG2 Meeting #89. Feb. 9-13, 2015, Athens, Greece. R2-150247.

Huawei, HiSilicon, Kick-off of SC-PTM, 3GPP TSG-RAN WG2 Meeting #89, Athens, Greece, Feb. 9-12, 2015. R2-150252.

Qualcomm Incorporated, PHY/MAC consideration for SC-PTM, 3GPP TSG RAN WG2 #89, Athens, Greece, Feb. 9-13, 2015. R2-150480.

* cited by examiner

METHOD AND SYSTEM FOR IMPLEMENTING SERVICE SCHEDULING, BASE STATION, AND USER EQUIPMENT

TECHNICAL FIELD

The present application relates to, but is not limited to, a mobile communication system.

BACKGROUND

With the rapid development of Internet technology and the great popularization of large-screen multifunctional mobile terminals, mobile data multimedia services and various high-bandwidth multimedia services, commonly including video sessions, television broadcasts, video on demand, advertisements, online education, interactive games and the like, are applied and promoted on a large scale. The application and promotion of these multimedia services not only meet multi-service demands of a mobile user, but also facilitate new service increase of a mobile operator. These mobile data multimedia services require multiple users to be able to receive the same data simultaneously. Compared with general data services, the mobile data multimedia services have the characteristics of large data volume, long duration, delay sensitivity and the like.

In order to effectively utilize mobile network resources, a 3rd Generation Partnership Project (3GPP) proposes Multimedia Broadcast Multicast Service (MBMS). The MBMS is a technology of transmitting data from a data source to multiple target mobile terminals, thereby sharing resources of networks (including a core network and an access network), and improving the utilization rate of network resources (particularly air interface resources). The MBMS defined by the 3GPP not only can realize plain-text low-rate message multicast and broadcast, but also can realize multimedia service broadcast and multicast. Various rich videos and audios are provided for multimedia services, which complies with the future development trend of mobile data without doubt and provides a better service prospect for the development of mobile communications.

The MBMS has the characteristics of large service data volume, long receiving duration of a mobile terminal and constant average data rate. The above-mentioned characteristics determine that scheduling and control signaling configurations of the MBMS are semi-static. That is, scheduling information and control signaling information of the MBMS remain unchanged 'for a long time'. These pieces of information are periodically sent through an MBMS Control Channel (MCCH), and are collectively referred to as MCCH information. An evolved MBMS (eMBMS) system may have multiple MCCHs, each MCCH corresponds to a different MBMS Single Frequency Network (MBSFN) region, herein control information of the MBMS sent by the corresponding MBSFN region is only borne.

An MBMS notification message is used for describing whether MCCH information changes. User Equipment (UE) in a mode of Radio Resource Control Idle (RRC Idle) or RRC Connected UE can know whether the MCCH information changes by only monitoring the MBMS notification message, so as to selectively receive the MCCH information. That is, only when the MCCH information changes, new MCCH information is received. The information amount of the MBMS notification message is much less than that of the MCCH information, so the UE selectively receives the MCCH information, resources can be effectively saved, and the power consumption is reduced. The MBMS notification message is borne on a Physical Downlink Control Channel (PDCCH) of a specified MBSFN subframe and periodically sent, and the MBSFN subframe and a sending period are indicated by a system message (System Information Block (SIB) 13) accordingly.

In a Long Term Evolution (LTE) system, UE (or referred to as a terminal) is notified that a certain MBMS will be subjected to session start or a network side initiates a counting request. Downlink Control Information (DCI) and an MBMS-Radio Network Temporary Identifier (RNTI) (M-RNTI) may be sent on a PDCCH first. The UE selectively reads a specific MCCH message according to information in the DCI, which is referred to as an MCCH change notification mechanism. Specific service configuration parameters such as a service ID, service Radio Link Control (RLC), Media Access Control (MAC) and physical layer configuration parameters will be sent on the MCCH message.

At present, MBMS technology is introduced into an LTE system of a Release 9 (R9), and an LTE system of a Release 10 (R10) is enhanced. In R9, control signaling and use data of MBMS are transmitted separately on a Control Plane (CP) and a User Plane (UP). The CP controls sending of the UP user data by controlling the start, update and end of the service, so as to achieve basic MBMS sending. The MBMS is sent in an MBSFN region with a fixed size (which may be configured statically or semi-statically). MBMS scheduling information is indicated by Multicast Channel (MCH) Scheduling Information (MSI) on the MBSFN subframe, and the MBMS is multiplexed in a time domain.

The 3GPP proposes a research project about single-cell MBMS in LTE-Advanced (LTE-A) of a Release 13 (R13), wherein the single-cell MBMS is transmitted on a Physical Downlink Share Channel (PDSCH), the process being referred to as Single Cell-Point To Multipoint (SC-PTM).

The PDCCH is indicating information for parsing data of the PDSCH. Therefore, the PDCCH is ahead of the PDSCH (data domain) in a time domain, and namely occupies the first, second, third and fourth symbols of a subframe. FIG. 1 is a channel diagram illustrating that a PDCCH occupies three symbols in a subframe in the existing technology. As shown in FIG. 1, a horizontal grid represents a PDSCH, a vertical grid represents a PDCCH, a left oblique grid represents a Physical Control Format Indication Channel (PCFICH), a right oblique grid represents a Physical Hybrid automatic repeat request Indicator Channel (PHICH), a black bar frame represents a Reference Signal (RS), and a white bar frame represents a Physical Broadcast Channel (PBCH). DCI sent in the PDCCH is used for indicating information such as resource configuration of the PDSCH, uplink resource license, and the like. A Cyclic Redundancy Check (CRC) at the tail of the PDCCH is 16 bits, and is scrambled by using a specific RNTI, the RNTI is used for identifying a UE or a specific purpose. The UE performs blind detection (blind detection refers to searching for a bit sequence obtained by descrambling by the UE in the absence of prior information) on the PDCCH of the received subframe to obtain a required control signaling. The blind detection is advantageous in no additional overhead and disadvantageous in high detection complexity. In order to reduce the complexity of searching, a concept of a search space is defined in TS36.213. Each UE searches for a control signaling in a specific search space, each search space containing a group of Control Channel Elements (CCE). The search space in LTE includes a common search space and a UE-specific search space.

In the above-mentioned service scheduling application, there are the following problems. Single-cell MBMS scheduling is greatly different from multi-cell MBMS (service scheduling indication through an MBSFN) scheduling: scheduling information of a PDSCH is transmitted on a PDCCH, the PDSCH may be multiplexed in a time domain, scheduling information of a Physical Multicast Channel (PMCH) is transmitted on MSI, and the PMCH can only be multiplexed in the time domain. Therefore, a multi-cell MBMS scheduling method cannot be used in the single-cell MBMS scheduling, and in view of difference between the MBMS and a unicast service, it is improper to dynamically schedule the MBMS on the PDCCH of each subframe. At present, there is no MBMS scheduling method suitable for single-cell transmission.

SUMMARY

The following is a summary for a subject described herein in detail. The summary is not intended to restrict the protection scope of claims.

The present document provides a method, system, evolved Node B (eNB) and UE for implementing service scheduling, capable of scheduling an SC-PTM MBMS.

A method for implementing service scheduling includes the steps as follows:

An eNB sends time-domain scheduling information of an SC-PTM MBMS to a UE;

the time-domain scheduling information is used for indicating a position of a time-domain subframe where the MBMS is located;

a PDCCH of the time-domain subframe includes frequency-domain scheduling information of the MBMS;

a CRC of the PDCCH is scrambled by using an RNTI corresponding to contents in a PDSCH, and the MBMS is sent on the PDSCH.

In an exemplary embodiment, the time-domain scheduling information is: MBMS Scheduling Channel (MSCH) information, or MSI, or Single cell-MCCH (S-MCCH) information.

In an exemplary embodiment, the position of the time-domain subframe includes: a frame period where the time-domain subframe is located, and an offset of the time-domain subframe in the frame period.

In an exemplary embodiment, when the time-domain scheduling information is S-MCCH information, the method further includes:

putting the S-MCCH information on a PDSCH, and scrambling a PDCCH of a subframe where an S-MCCH is located by using a Group-RNTI (G-RNTI);

multiplexing the S-MCCH and an S-MTCH in the same subframe or multiplexing the S-MCCH and the S-MTCH in different subframes; and putting the scrambled PDCCH in a common search space.

In an exemplary embodiment, the method further includes:

when the S-MCCH corresponds to a G-RNTI, indicating a correspondence between the G-RNTI and the S-MCCH through a broadcast message; or when the S-MCCH and the S-MTCH are multiplexed in the same subframe and correspond to the same G-RNTI, indicating the G-RNTI through a broadcast message; or when the MBMS corresponds to different G-RNTIs, indicating a mapping relation between a Temporarily Mobile Group Identifier (TMGI) of the MBMS and a G-RNTI through the S-MCCH, where the broadcast message is an SIB13, a new SIB or an MCCH.

In an exemplary embodiment, the method further includes:

if two or more S-MTCHs are multiplexed in the same subframe, or an S-MCCH and an S-MTCH are multiplexed, or an S-MTCH and a unicast service are multiplexed, identifying and distinguishing a different logical channel according to a Logical Channel Identifiers (LCID) in a subframe MAC header.

In an exemplary embodiment, when the time-domain scheduling information is MSCH information, the method further includes the step as follows:

the eNB indicates configuration information of the MSCH information through the S-MCCH, herein the time-domain scheduling information is put on the MSCH.

When the time-domain scheduling information is MSI, the method further includes the step as follows:

the eNB indicates configuration information of an MAC Control Element (CE) where the MSI is located through the S-MCCH, herein the time-domain scheduling information is put on the MAC CE.

When the time-domain scheduling information is S-MCCH information, the method further includes the step as follows:

the eNB indicates configuration information of the S-MCCH information through a system broadcast message SIB or an MCCH.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

In an exemplary embodiment, the frequency-domain scheduling information is put into DCI of the PDCCH, and the frequency-domain scheduling information includes: an initial position of the MBMS in a frequency domain and the number of occupied Resource Blocks (RBs).

A method for implementing service scheduling includes the steps as follows:

a UE receives time-domain scheduling information, performs blind detection at a position of a time-domain subframe indicated by the time-domain scheduling information, determines a PDCCH including frequency-domain scheduling information of MBMS, and reads the frequency-domain scheduling information on the PDCCH. The UE receives the MBMS on a PDSCH based on the read frequency-domain scheduling information.

In an exemplary embodiment, when the time-domain scheduling information is MSCH information, the method further includes the step as follows:

the UE acquires configuration information of an MSCH through indication of an S-MCCH, and receives a corresponding MSCH at a position indicated by the configuration information of the MSCH.

When the time-domain scheduling information is MSI, the method further includes the step as follows:

the UE acquires configuration information of an MAC CE through indication of an S-MCCH, and receives a corresponding MSI at a position indicated by the configuration information of the MAC CE.

When the time-domain scheduling information is S-MCCH information, the method further includes the step as follows:

the UE acquires configuration information of the S-MCCH information through indication of a system broadcast message SIB or an MCCH, and reads the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

In an exemplary embodiment, reading the frequency-domain scheduling information includes:

the UE receives a subframe at the position of the time-domain subframe indicated by the time-domain scheduling information, performs blind detection on a PDCCH of the subframe at the indicated position of the time-domain subframe, and determines that the blind detection on the PDCCH for putting the frequency-domain scheduling information succeeds. The blind detection is: scrambling a CRC bit of the received PDCCH by using a G-RNTI, and checking scrambled information, when the check is correct, the blind detection succeeds.

In an exemplary embodiment, the UE is a UE having an SC-PTM receiving capability and interested in receiving the MBMS.

A method for implementing service scheduling includes the steps as follows:

an eNB sends time-domain scheduling information of an SC-PTM MBMS to a UE, the time-domain scheduling information is used for indicating a position of a time-domain subframe where the MBMS is located, and a PDCCH of the time-domain subframe includes frequency-domain scheduling information of the MBMS;

a UE receives the time-domain scheduling information, performs blind detection at a position of a time-domain subframe indicated by the time-domain scheduling information, determines the PDCCH including frequency-domain scheduling information of the MBMS, and reads the frequency-domain scheduling information on the PDCCH;

the UE receives the MBMS on a PDSCH based on the read frequency-domain scheduling information;

herein a CRC of the PDCCH is scrambled by using an RNTI corresponding to contents in a PDSCH;

the MBMS is sent on the PDSCH.

In an exemplary embodiment, when the time-domain scheduling information is S-MCCH information, the method further includes:

putting the S-MCCH information to a PDSCH, and scrambling a PDCCH of a subframe where an S-MCCH is located by using a G-RNTI;

multiplexing the S-MCCH and an S-MTCH in the same subframe or multiplexing the S-MCCH and the S-MTCH in different subframes; and putting the scrambled PDCCH in a common search space.

In an exemplary embodiment, the method further includes:

when the S-MCCH corresponds to a G-RNTI, indicating a correspondence between the G-RNTI and the S-MCCH through a broadcast message; or when the S-MCCH and the S-MTCH are multiplexed in the same subframe and correspond to the same G-RNTI, indicating the G-RNTI through a broadcast message; or when the MBMS corresponds to different G-RNTIs, indicating a mapping relation between a TMGI of the MBMS and a G-RNTI through the S-MCCH, herein the broadcast message is an SIB13, a new SIB or an MCCH.

In an exemplary embodiment, the method further includes:

if two or more S-MTCHs are multiplexed in the same subframe or an S-MCCH and an S-MTCH are multiplexed or an S-MTCH and a unicast service are multiplexed, identifying and distinguishing a different logical channel according to an LCID in a subframe MAC header.

In an exemplary embodiment, when the time-domain scheduling information is MSCH information, the method further includes the step as follows:

The eNB indicates configuration information of the MSCH information through the S-MCCH, the time-domain scheduling information is put on an MSCH. The UE acquires the configuration information of the MSCH through indication of the S-MCCH, and receives the corresponding MSCH at a position indicated by the configuration information of the MSCH.

When the time-domain scheduling information is MSI, the method further includes the step as follows:

The eNB indicates configuration information of an MAC CE where the MSI is located through the S-MCCH, the time-domain scheduling information is put on the MAC CE. The UE acquires the configuration information of the MAC CE through indication of the S-MCCH, and receives the corresponding MSI at a position indicated by the configuration information of the MAC CE.

When the time-domain scheduling information is S-MCCH information, the method further includes the step as follows:

The eNB indicates configuration information of the S-MCCH information through a system broadcast message SIB or an MCCH.

The UE reads the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

An eNB for implementing service scheduling includes a sending unit, configured to: send time-domain scheduling information of an SC-PTM MBMS to a UE.

Herein The time-domain scheduling information is used for indicating the position of a time-domain subframe where the MBMS is located. A PDCCH of the time-domain subframe includes frequency-domain scheduling information of the MBMS. A CRC of the PDCCH is scrambled by using an RNTI corresponding to contents in a PDSCH. The MBMS is sent on the PDSCH.

In an exemplary embodiment, the eNB further includes a scrambling unit, configured to: scramble, when the time-domain scheduling information is S-MCCH information, the PDCCH through a G-RNTI to identify an S-MCCH, and put the scrambled PDCCH in a common search space.

In an exemplary embodiment, the eNB further includes a broadcast indication unit, configured to: indicate, when the S-MCCH corresponds to a G-RNTI, a correspondence between the G-RNTI and the S-MCCH through a broadcast message; or, indicate, when the S-MCCH and the S-MTCH are multiplexed in the same subframe and correspond to the same G-RNTI, the G-RNTI through a broadcast message; or indicate, when the MBMS corresponds to different G-RNTIs, a mapping relation between a TMGI of the MBMS and a G-RNTIs through the S-MCCH.

Herein the broadcast message is an SIB13, a new SIB or an MCCH.

In an exemplary embodiment, the eNB further includes an indication unit.

When the time-domain scheduling information is MSCH information, the indication unit is configured to: indicate configuration information of the MSCH information through the S-MCCH, and send the indicated configuration information of the MSCH information to the UE, the time-domain scheduling information is put on an MSCH.

When the time-domain scheduling information is MSI, the indication unit is configured to: indicate configuration information of an MAC CE where the MSI is located through the S-MCCH, and send the configuration information of the MAC CE to the UE, the time-domain scheduling information is put on the MAC CE.

When the time-domain scheduling information is S-MCCH information, the indication unit is configured to: indicate configuration information of the S-MCCH information through an SIB or an MCCH, and send the configuration information to the UE.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

A UE for implementing service scheduling includes: a reading unit and a service receiving unit.

The reading unit is configured to: receive time-domain scheduling information sent by an eNB, perform blind detection at a position of a time-domain subframe indicated by the time-domain scheduling information, determine a PDCCH including frequency-domain scheduling information of MBMS, and read the frequency-domain scheduling information on the PDCCH; and the service receiving unit is configured to: receive the MBMS on a PDSCH based on the read frequency-domain scheduling information.

In an exemplary embodiment, the UE further includes a receiving indication unit.

When the time-domain scheduling information is MSCH information, the receiving indication unit is configured to: receive configuration information of the MSCH information indicated by an S-MCCH, acquire the configuration information of an MSCH through indication of the S-MCCH, and receive the corresponding MSCH at a position indicated by the configuration information of the MSCH.

When the time-domain scheduling information is MSI, the receiving indication unit is configured to: receive configuration information of an MAC CE indicated by an S-MCCH, acquire the configuration information of the MAC CE through indication of the S-MCCH, and receive the corresponding MSI at a position indicated by the configuration information of the MAC CE.

When the time-domain scheduling information is S-MCCH information, the receiving indication unit is configured to: receive configuration information of the S-MCCH information through indication of a system broadcast message or an MCCH, and read the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

In an exemplary embodiment, the reading unit is configured to: receive the time-domain scheduling information sent by the eNB, perform, according to a subframe indicated by the time-domain scheduling information, blind detection on a PDCCH of the subframe, and determine that the blind detection on the PDCCH for putting the frequency-domain scheduling information succeeds.

A system for implementing service scheduling includes: an eNB and a UE.

The eNB includes a sending unit, configured to: send time-domain scheduling information of an SC-PTM MBMS to the UE, the time-domain scheduling information is used for indicating the position of a time-domain subframe where the MBMS is located, and a PDCCH of the time-domain subframe includes frequency-domain scheduling information of the MBMS.

The UE includes a reading unit and a service receiving unit.

The reading unit is configured to: receive time-domain scheduling information, perform blind detection at a position of a time-domain subframe indicated by the time-domain scheduling information, determine the PDCCH including frequency-domain scheduling information of the MBMS, and read the frequency-domain scheduling information on the PDCCH.

The service receiving unit is configured to: receive the MBMS on a PDSCH on the basis of the read frequency-domain scheduling information.

A CRC of the PDCCH is scrambled by using an RNTI corresponding to contents in a PDSCH.

The MBMS is sent on the PDSCH.

In an exemplary embodiment, the eNB further includes an indication unit, and the UE further includes a receiving indication unit.

When the time-domain scheduling information is MSCH information, the indication unit is configured to: indicate configuration information of the MSCH information through the S-MCCH, and send the indicated configuration information of the MSCH information to the UE.

The time-domain scheduling information is put on an MSCH.

The receiving indication unit is configured to: receive the configuration information of the MSCH information indicated by the S-MCCH, acquire the configuration information of the MSCH through indication of the S-MCCH, and receive the corresponding MSCH at a position indicated by the configuration information of the MSCH.

When the time-domain scheduling information is MSI, the indication unit is configured to: indicate configuration information of an MAC CE where the MSI is located through the S-MCCH, and send the configuration information of the MAC CE to the UE.

The time-domain scheduling information is put on the MAC CE.

The receiving indication unit is configured to: receive the configuration information of the MAC CE indicated by the S-MCCH, acquire the configuration information of the MAC CE through indication of the S-MCCH, and receive the corresponding MSI at a position indicated by the configuration information of the MAC CE.

When the time-domain scheduling information is S-MCCH information, the indication unit is configured to: indicate configuration information of the S-MCCH information through an SIB or an MCCH, and send the configuration information to the UE, and the receiving indication unit is configured to: receive the configuration information of the S-MCCH information, and read the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

A computer-readable storage medium stores computer-executable instructions, the computer-executable instructions are used to execute any one of the above mentioned methods.

The scheme of the present application includes: an eNB sends time-domain scheduling information of an SC-PTM MBMS to a UE, the time-domain scheduling information is used for indicating the position of a time-domain subframe where the MBMS is located, and a PDCCH of the time-domain subframe includes frequency-domain scheduling information of the MBMS. A UE receives time-domain scheduling information, performs blind detection at a position of a time-domain subframe indicated by the time-domain scheduling information, determines a PDCCH including frequency-domain scheduling information of MBMS, and reads the frequency-domain scheduling information on the PDCCH. The UE receives the MBMS on a PDSCH on the basis of the read frequency-domain scheduling information. A CRC of the PDCCH is scrambled by using an RNTI corresponding to contents in a PDSCH, and the MBMS is sent on the PDSCH. According to the embodiments of the present disclosure, time-domain scheduling information is sent through an eNB, after receiving the time-domain scheduling information, a UE acquires frequency-domain scheduling information and receives MBMS according to the frequency-domain scheduling information, and a service scheduling method for transmitting MBMS in a single cell is provided.

After the drawings and the detailed descriptions are read and understood, other aspects may be understood.

DETAILED DESCRIPTION

An implementation mode of the present disclosure will be illustrated hereinbelow with reference to the drawings in detail. It should be noted that embodiments in the present disclosure and characteristics in the embodiments may be randomly combined under the condition of no conflicts.

Figure 1:
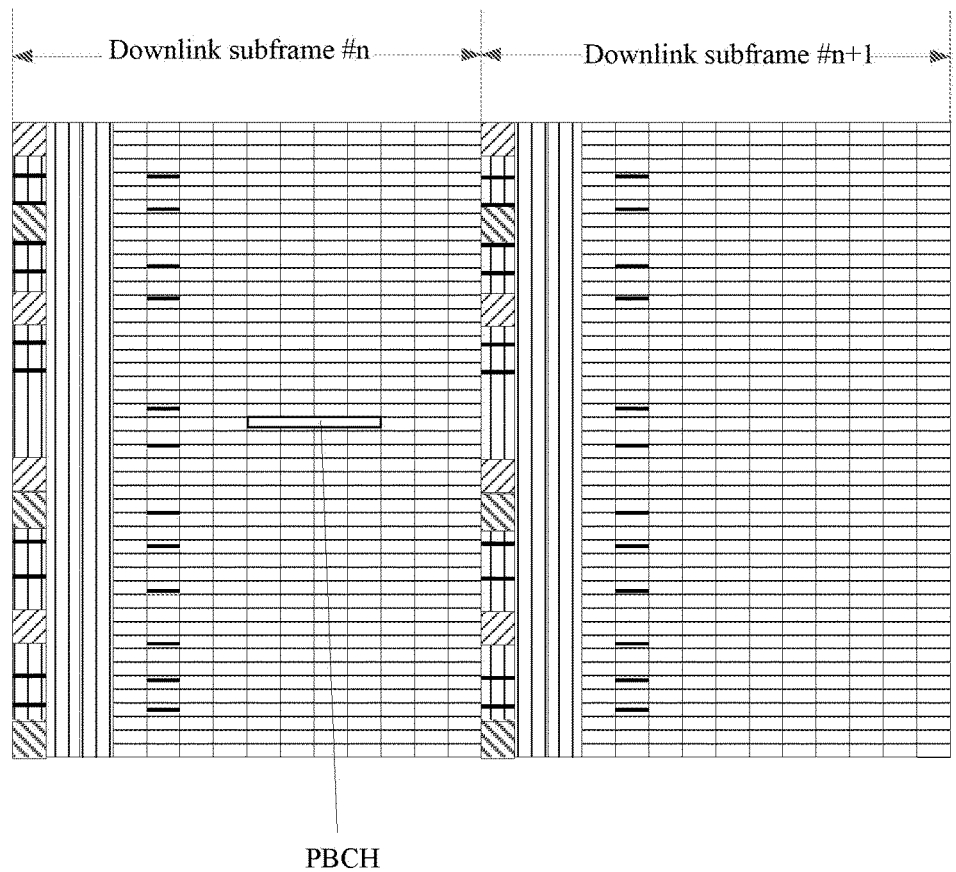
FIG. 1 is a channel diagram illustrating that a PDCCH occupies three symbols in a subframe in the existing technology.
Figure 2:
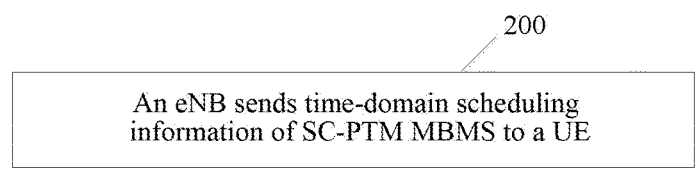
FIG. 2 is a flowchart of a method for implementing service scheduling according to an embodiment of the present disclosure.

FIG. 2 is a flowchart of a method for implementing service scheduling according to an embodiment of the present disclosure. As shown in FIG. 2, the method includes the step 200 as follows.

In Step 200, an eNB sends time-domain scheduling information of SC-PTM MBMS to a UE.

Herein, the time-domain scheduling information is used for indicating the position of a time-domain subframe where the MBMS is located, and a PDCCH of the time-domain subframe includes frequency-domain scheduling information of the MBMS.

A CRC of the PDCCH is scrambled by using an RNTI corresponding to contents in a PDSCH.

Scrambling a CRC of the PDCCH by using an RNTI corresponding to contents in a PDSCH refers to: scrambling a CRC of the PDCCH by using an RNTI for scrambling contents in a PDSCH.

The position of the time-domain subframe includes: a frame period where the time-domain subframe is located, and an offset of the time-domain subframe in the frame period.

The time-domain scheduling information is: MSCH information, or MSI, or S-MCCH information.

When the time-domain scheduling information is S-MCCH information, the method in the embodiment of the present disclosure further includes:

putting the S-MCCH information to a PDSCH, and scrambling a PDCCH of a subframe where an S-MCCH is located by using a G-RNTI;

multiplexing the S-MCCH and an S-MTCH in the same subframe or multiplexing the S-MCCH and the S-MTCH in different subframes; and putting the scrambled PDCCH in a common search space.

Here, the S-MCCH is the content of the MBMS, and belongs to common senses of a person skilled in the art.

The method in the embodiment of the present disclosure further includes:

when the S-MCCH corresponds to a G-RNTI, indicating a correspondence between the G-RNTI and the S-MCCH through a broadcast message; or when the S-MCCH and the S-MTCH are multiplexed in the same subframe and correspond to the same G-RNTI, indicating the G-RNTI through a broadcast message; or when the MBMS corresponds to different G-RNTIs, indicating a mapping relation between a TMGI of the MBMS and a G-RNTI through the S-MCCH, herein the broadcast message is an SIB13, a new SIB or an MCCH.

The method in the embodiment of the present disclosure further includes:

if two or more S-MTCHs are multiplexed in the same subframe or an S-MCCH and an S-MTCH are multiplexed or an S-MTCH and a unicast service are multiplexed, identifying and distinguishing a different logical channel according to an LCID in a subframe MAC header.

When the time-domain scheduling information is MSCH information, the method in the embodiment of the present disclosure further includes the step as follows.

The eNB indicates configuration information of the MSCH information through the S-MCCH, the time-domain scheduling information is put on an MSCH.

When the time-domain scheduling information is MSI, the method in the embodiment of the present disclosure further includes the step as follows.

The eNB indicates configuration information of an MAC CE where the MSI is located through the S-MCCH, the time-domain scheduling information is put on the MAC CE.

When the time-domain scheduling information is S-MCCH information, the method in the embodiment of the present disclosure further includes the step as follows.

The eNB indicates configuration information of the S-MCCH information through a system broadcast message SIB or an MCCH.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

In the method in the embodiment of the present disclosure, the frequency-domain scheduling information is put into DCI of the PDCCH, and includes an initial position of the MBMS in a frequency domain and the number of occupied RBs.

Figure 3:
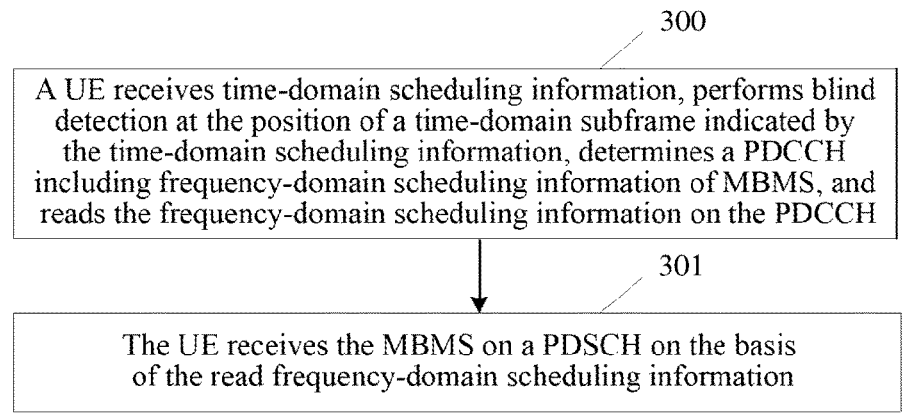
FIG. 3 is a flowchart of another method for implementing service scheduling according to an embodiment of the present disclosure.

FIG. 3 is a flowchart of another method for implementing service scheduling according to an embodiment of the present disclosure. As shown in FIG. 3, the method includes the steps 300 and 301 as follows.

In Step 300, a UE receives time-domain scheduling information, performs blind detection at the position of a time-domain subframe indicated by the time-domain scheduling information, determines a PDCCH including frequency-domain scheduling information of MBMS, and reads the frequency-domain scheduling information on the PDCCH.

When the time-domain scheduling information is MSCH information, the method further includes the step as follows.

The UE acquires configuration information of an MSCH through indication of an S-MCCH, and receives the corresponding MSCH at a position indicated by the configuration information of the MSCH.

When the time-domain scheduling information is MSI, the method further includes the step as follows.

The UE acquires configuration information of an MAC CE through indication of an S-MCCH, and receives the corresponding MSI at a position indicated by the configuration information of the MAC CE.

When the time-domain scheduling information is S-MCCH information, the method further includes the step as follows.

The UE acquires configuration information of the S-MCCH information through indication of system broadcast message or an MCCH, and reads the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

In Step 301, the UE receives the MBMS on a PDSCH on the basis of the read frequency-domain scheduling information.

Reading the frequency-domain scheduling information includes:

the UE receives a subframe at the position of the time-domain subframe indicated by the time-domain scheduling information, performs blind detection on a PDCCH of the subframe at the indicated position of the time-domain subframe, and determines that the blind detection on the PDCCH for putting the frequency-domain scheduling information succeeds.

The blind detection is: scrambling a CRC bit of the received PDCCH by using a G-RNTI, and checking the scrambled information, where when the check is correct, the blind detection succeeds.

Figure 4:
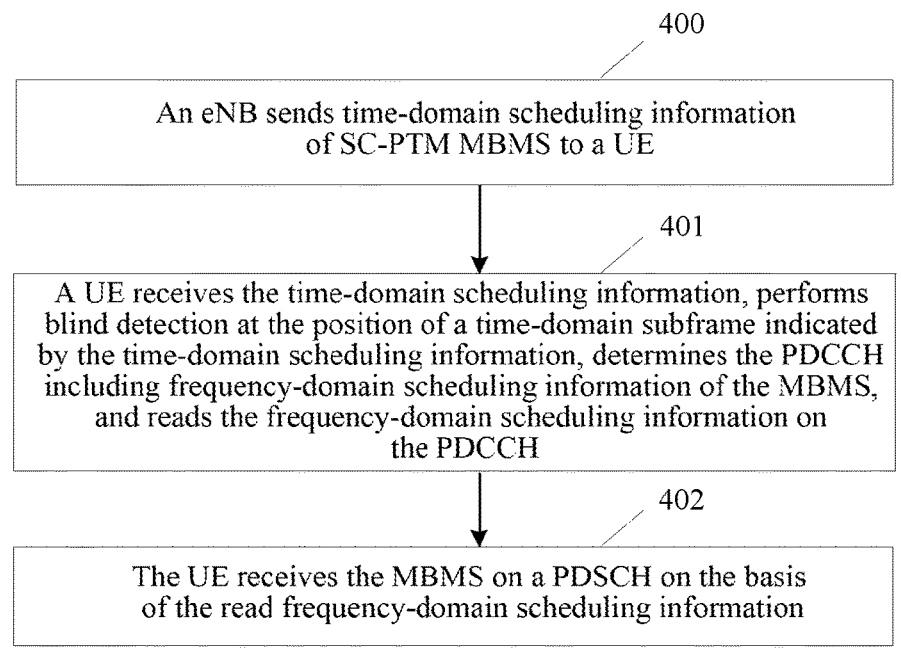
FIG. 4 is a flowchart of a further method for implementing service scheduling according to an embodiment of the present disclosure.

FIG. 4 is a flowchart of a further method for implementing service scheduling according to an embodiment of the present disclosure. As shown in FIG. 4, the method includes the steps 400-402 as follows.

In Step 400, an eNB sends time-domain scheduling information of SC-PTM MBMS to a UE.

Herein, the time-domain scheduling information is used for indicating the position of a time-domain subframe where the MBMS is located, and a PDCCH of the time-domain subframe includes frequency-domain scheduling information of the MBMS.

A CRC of the PDCCH is scrambled by using an RNTI corresponding to contents in a PDSCH.

The MBMS is sent on the PDSCH.

When the time-domain scheduling information is MSCH information, the method in the embodiment of the present disclosure further includes the step as follows.

The eNB indicates configuration information of the MSCH information through the S-MCCH, the time-domain scheduling information is put on an MSCH. The UE acquires the configuration information of the MSCH through indication of the S-MCCH, and receives the corresponding MSCH at a position indicated by the configuration information of the MSCH.

When the time-domain scheduling information is MSI, the method in the embodiment of the present disclosure further includes the step as follows.

The eNB indicates configuration information of an MAC CE where the MSI is located through the S-MCCH, the time-domain scheduling information is put on the MAC CE. The UE acquires the configuration information of the MAC CE through indication of the S-MCCH, and receives the corresponding MSI at a position indicated by the configuration information of the MAC CE.

When the time-domain scheduling information is S-MCCH information, the method in the embodiment of the present disclosure further includes the step as follows.

The eNB indicates configuration information of the S-MCCH information through an SIB or an MCCH. The UE reads the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

When the time-domain scheduling information is S-MCCH information, the method in the embodiment of the present disclosure further includes:

putting the S-MCCH information on a PDSCH, and scrambling a PDCCH of a subframe where an S-MCCH is located by using a G-RNTI;

multiplexing the S-MCCH and an S-MTCH in the same subframe or multiplexing the S-MCCH and the S-MTCH in different subframes; and putting the scrambled PDCCH in a common search space.

The method in the embodiment of the present disclosure further includes:

when the S-MCCH corresponds to a G-RNTI, indicating a correspondence between the G-RNTI and the S-MCCH through a broadcast message; or when the S-MCCH and the S-MTCH are multiplexed in the same subframe and correspond to the same G-RNTI, indicating the G-RNTI through a broadcast message; or when the MBMS corresponds to different G-RNTIs, indicating a mapping relation between a TMGI of the MBMS and a G-RNTI through the S-MCCH, herein the broadcast message is an SIB13, a new SIB or an MCCH.

The method in the embodiment of the present disclosure further includes:

if two or more S-MTCHs are multiplexed in the same subframe or an S-MCCH and an S-MTCH are multiplexed or an S-MTCH and a unicast service are multiplexed, identifying and distinguishing a different logical channel according to an LCID in a subframe MAC header.

In Step 401, a UE receives the time-domain scheduling information, performs blind detection at the position of a time-domain subframe indicated by the time-domain scheduling information, determines the PDCCH including frequency-domain scheduling information of the MBMS, and reads the frequency-domain scheduling information on the PDCCH. Herein, the UE is a UE having an SC-PTM receiving capability and interested in receiving of the MBMS.

Herein, the frequency-domain scheduling information is in DCI of the PDCCH.

The frequency-domain scheduling information at least includes: an initial position of the MBMS in a frequency domain and the number of occupied RBs.

In Step 402, the UE receives the MBMS on a PDSCH on the basis of the read frequency-domain scheduling information.

Figure 5:
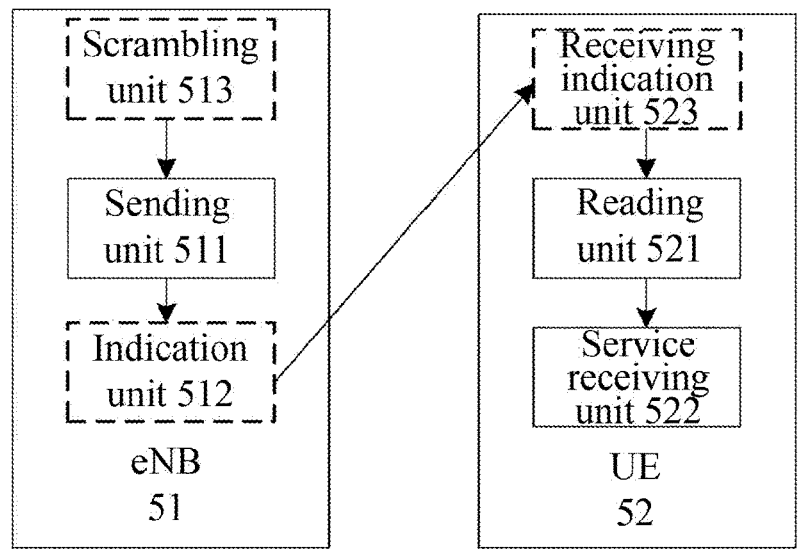
FIG. 5 is a block diagram of a system for implementing service scheduling according to an embodiment of the present disclosure.

FIG. 5 is a block diagram of a system for implementing service scheduling according to an embodiment of the present disclosure. As shown in FIG. 5, the system includes: an eNB 51 and a UE 52.

The eNB 51 includes a sending unit 511, configured to: send time-domain scheduling information of an SC-PTM MBMS to the UE 52. Herein, the time-domain scheduling information is used for indicating the position of a time-domain subframe where the MBMS is located.

A PDCCH of the time-domain subframe includes frequency-domain scheduling information of the MBMS.

The UE 52 includes a reading unit 521 and a service receiving unit 522.

The reading unit 521 is configured to: receive time-domain scheduling information, perform blind detection at the position of a time-domain subframe indicated by the time-domain scheduling information, determine a PDCCH including frequency-domain scheduling information of MBMS, and read the frequency-domain scheduling information on the PDCCH.

The service receiving unit 522 is configured to: receive the MBMS on a PDSCH on the basis of the read frequency-domain scheduling information.

A CRC of the PDCCH is scrambled by using an RNTI corresponding to contents in a PDSCH, and the MBMS is sent on the PDSCH.

The eNB 51 further includes an indication unit 512, and the UE 52 further includes a receiving indication unit 523.

When the time-domain scheduling information is MSCH information, the indication unit 512 is configured to: indicate configuration information of the MSCH information through the S-MCCH, and send the indicated configuration information of the MSCH information to the UE 52.

The time-domain scheduling information is put on an MSCH.

The receiving indication unit 523 is configured to: receive the configuration information of the MSCH information indicated by the S-MCCH, acquire the configuration information of the MSCH through indication of the S-MCCH, and receive the corresponding MSCH at a position indicated by the configuration information of the MSCH.

When the time-domain scheduling information is MSI, the indication unit 512 is configured to: indicate configuration information of an MAC CE where the MSI is located through the S-MCCH, and send the configuration information of the MAC CE to the UE 52.

The time-domain scheduling information is put on the MAC CE.

The receiving indication unit 523 is configured to: receive the configuration information of the MAC CE indicated by the S-MCCH, acquire the configuration information of the MAC CE through indication of the S-MCCH, and receive the corresponding MSI at a position indicated by the configuration information of the MAC CE.

When the time-domain scheduling information is S-MCCH information, the indication unit 512 is configured to: indicate configuration information of the S-MCCH information through an SIB or an MCCH, and send the configuration information to the UE 52; and the receiving indication unit 523 is configured to: receive the configuration information of the S-MCCH information, and read the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

The UE 52 is a UE having an SC-PTM receiving capability and interested in receiving of the MBMS.

An eNB 51 for implementing service scheduling at least includes a sending unit 511, configured to: send time-domain scheduling information of an SC-PTM MBMS to a UE 52.

The time-domain scheduling information is used for indicating the position of a time-domain subframe where the MBMS is located.

A PDCCH of the time-domain subframe includes frequency-domain scheduling information of the MBMS.

A CRC of the PDCCH is scrambled by using an RNTI corresponding to contents in a PDSCH, and the MBMS is sent on the PDSCH.

The eNB 51 in the embodiment of the present disclosure further includes a scrambling unit 513, configured to: scramble, when the time-domain scheduling information is S-MCCH information, the PDCCH through a G-RNTI to identify an S-MCCH, and put the scrambled PDCCH in a common search space.

The eNB 51 in the embodiment of the present disclosure further includes a broadcast indication unit, configured to: indicate, when the S-MCCH corresponds to a G-RNTI, a correspondence between the G-RNTI and the S-MCCH through a broadcast message; or, indicate, when the S-MCCH and the S-MTCH are multiplexed in the same subframe and correspond to the same G-RNTI, the G-RNTI through a broadcast message; or indicate, when the MBMS corresponds to different G-RNTIs, a mapping relation between a TMGI of the MBMS and a G-RNTI through the S-MCCH.

Herein the broadcast message is an SIB13, a new SIB or an MCCH.

The eNB 51 further includes an indication unit 512.

When the time-domain scheduling information is MSCH information, the indication unit 512 is configured to: indicate configuration information of the MSCH information through the S-MCCH, and send the indicated configuration information of the MSCH information to the UE 52.

The time-domain scheduling information is put on an MSCH.

When the time-domain scheduling information is MSI, the indication unit 512 is configured to: indicate configuration information of an MAC CE where the MSI is located through the S-MCCH, and send the configuration information of the MAC CE to the UE 52.

The time-domain scheduling information is put on the MAC CE.

When the time-domain scheduling information is S-MCCH information, the indication unit 512 is configured to: indicate configuration information of the S-MCCH information through system broadcast message SIB or an MCCH, and send the configuration information to the UE 52.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

A UE 52 for implementing service scheduling includes: a reading unit 521 and a service receiving unit 522.

The reading unit 521 is configured to: receive time-domain scheduling information sent by an eNB, perform blind detection at the position of a time-domain subframe indicated by the time-domain scheduling information, determine a PDCCH including frequency-domain scheduling information of MBMS, and read the frequency-domain scheduling information on the PDCCH.

The service receiving unit 522 is configured to: receive the MBMS on a PDSCH on the basis of the read frequency-domain scheduling information.

The UE in the embodiment of the present disclosure further includes a receiving indication unit 523.

When the time-domain scheduling information is MSCH information, the receiving indication unit 523 is configured to: receive configuration information of the MSCH information indicated by an S-MCCH, acquire the configuration information of an MSCH through indication of the S-MCCH, and receive the corresponding MSCH at a position indicated by the configuration information of the MSCH.

When the time-domain scheduling information is MSI, the receiving indication unit 523 is configured to: receive configuration information of an MAC CE indicated by an S-MCCH, acquire the configuration information of the MAC CE through indication of the S-MCCH, and receive the corresponding MSI at a position indicated by the configuration information of the MAC CE.

When the time-domain scheduling information is S-MCCH information, the receiving indication unit 523 is configured to: receive configuration information of the S-MCCH information through indication of a system broadcast message or an MCCH, and read the S-MCCH information according to the configuration information of the S-MCCH information.

The configuration information of the MSCH information includes: an offset position of a subframe where the MSCH information is located, and a frame period of the subframe where the MSCH information is located.

The configuration information of the MAC CE includes: an offset position of a subframe where the MAC CE is located, and a frame period of the subframe where the MAC CE is located.

The configuration information of the S-MCCH information includes: a frame period of a subframe where the S-MCCH information is located, and an offset position of the subframe where the S-MCCH information is located.

The reading unit 521 is configured to: receive the time-domain scheduling information sent by an eNB 51, perform, according to a subframe indicated by the time-domain scheduling information, blind detection on a PDCCH of the subframe, and determine that the blind detection on the PDCCH for putting the frequency-domain scheduling information succeeds.

Embodiment 1

Figure 6:
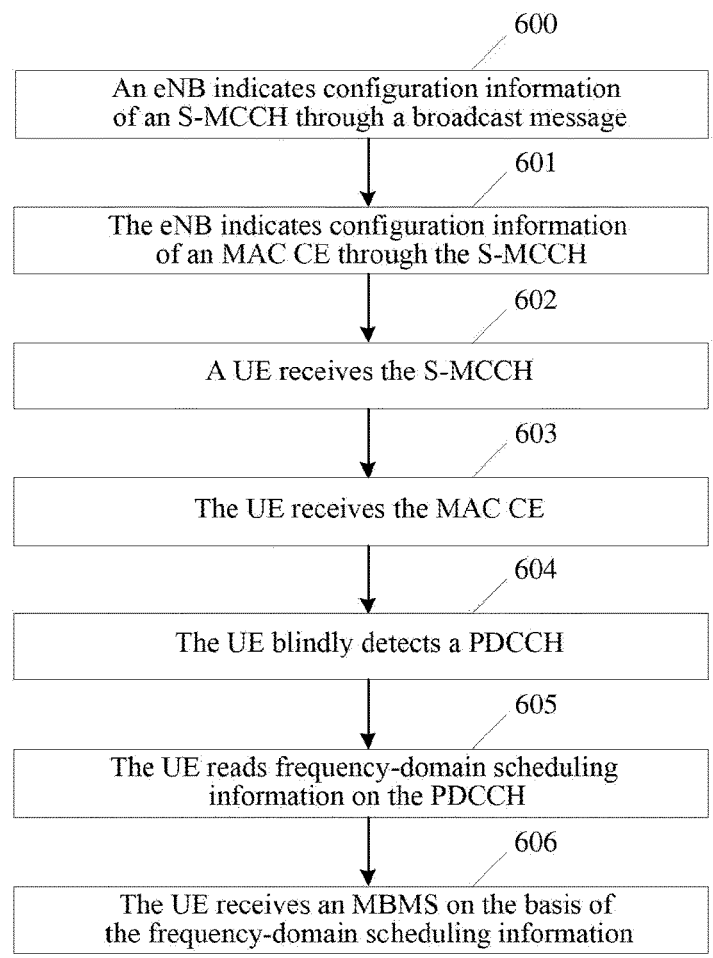
FIG. 6 is a flowchart of a method according to a first embodiment of the present disclosure.

Time-domain scheduling information of MBMS in Embodiment 1 is sent on an MAC CE. FIG. 6 is a flowchart of a method according to a first embodiment of the present disclosure. As shown in FIG. 6, the method includes the steps 600-606 as follows.

In Step 600, an eNB indicates configuration information of an S-MCCH through a broadcast message.

Herein, the broadcast message is an existing MBMS system message such as an SIB13 or an SIB15, the S-MCCH is an MCCH corresponding to a single cell, and the configuration information is position information about a subframe where S-MCCH information is located, such as a frame period and a subframe offset. Herein, the S-MCCH further includes: a TMGI of the MBMS.

In Step 601, the eNB indicates configuration information of an MAC CE through the S-MCCH.

The configuration information of the MAC CE at least includes: time-domain position information about the MAC CE, the time-domain position information at least including: a frame period of the MAC CE and a subframe offset of the MAC CE.

In Step 602, a UE receives the S-MCCH. Herein the UE indicates configuration information of the S-MCCH according to a broadcast message, and the configuration information of the S-MCCH includes: a frame period of an S-MCCH subframe, and/or an offset position of the subframe. The UE receives the S-MCCH according to the configuration information of the S-MCCH.

In Step 603, the UE receives the MAC CE.

The UE indicates configuration information of the MAC CE through the S-MCCH, and receives the corresponding MAC CE at a position indicated by the configuration information of the MAC CE. Herein MSI is used for indicating MBMS in the MAC CE, and for logic channel IDs (LCIDs) in the MSI, the order of LCIDs in the MSI in the MAC CE is consistent with the order of TMGIs in the S-MCCH.

In Step 604, the UE blindly detects a PDCCH. Herein the UE determines, according to indication of the MAC CE, a subframe where frequency-domain scheduling information is put, and then obtains the position of the PDCCH by performing blind detection through a G-RNTI. The blind detection refers to: scrambling, by the UE, a CRC by using the G-RNTI, and then performing checking.

It is judged whether checking through the CRC scrambled by the G-RNTI succeeds, if yes, it is illustrated that what is required is the frequency-domain scheduling information, otherwise, blind detection on the PDCCH is continuously performed.

In Step 605, the UE reads frequency-domain scheduling information on the PDCCH.

The UE reads the frequency-domain scheduling information of the PDCCH on which blind detection succeeds. Herein the UE reads MBMS scheduling information on DCI in the PDCCH.

In Step 606, the UE receives MBMS on the basis of the frequency-domain scheduling information.

The UE receives the MBMS on a PDSCH according to the frequency-domain scheduling information on the PDCCH.

Embodiment 2

Figure 7:
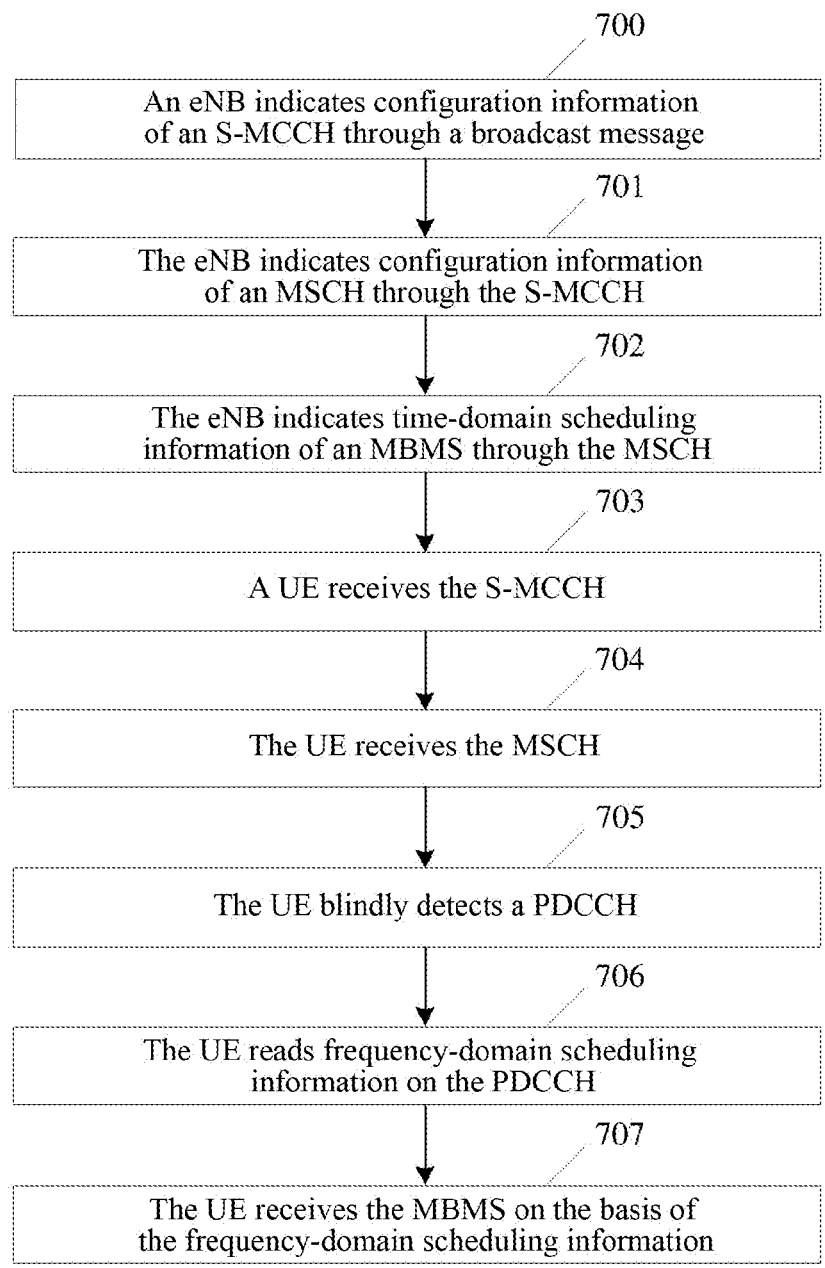
FIG. 7 is a flowchart of a method according to a second embodiment of the present disclosure.

Time-domain scheduling information of MBMS in Embodiment 2 is sent on an MSCH. FIG. 7 is a flowchart of a method according to a second embodiment of the present disclosure. As shown in FIG. 7, the method includes the steps 700-707 as follows.

In Step 700, an eNB indicates configuration information of an S-MCCH through a broadcast message.

Herein, the broadcast message is an existing MBMS system message such as an SIB13 or an SIB15. The S-MCCH is an MCCH corresponding to a single cell. The configuration information is position information about a subframe where S-MCCH information is located, such as a frame period and a subframe offset.

In Step 701, the eNB indicates configuration information of an MSCH through the S-MCCH.

The configuration information of the MSCH at least includes: time-domain position information about the MSCH, the time-domain position information at least including: a frame period of the MSCH and a subframe offset of the MSCH.

In Step 702, the eNB indicates time-domain scheduling information of MBMS through the MSCH.

The time-domain scheduling information of the MBMS at least includes: time-domain position information corresponding to an MBMS identified by an MBMS identifier TMGI, and the time-domain scheduling information at least includes: a frame period of a TMGI service and a subframe offset.

In Step 703, a UE receives the S-MCCH. The UE indicates configuration information of the S-MCCH according to a broadcast message, the configuration information of the S-MCCH includes: a frame period of an S-MCCH subframe, and/or an offset position of the subframe. The UE receives the S-MCCH according to the configuration information of the S-MCCH.

In Step 704, the UE receives the MSCH.

The UE indicates configuration information of the MSCH through the S-MCCH, and receives the corresponding MSCH at a position indicated by the configuration information of the MSCH, herein the MSCH is transmitted through a DL-SCH and put on a PDSCH.

In Step 705, the UE blindly detects a PDCCH.

The UE determines, according to indication of the MSCH, a subframe where frequency-domain scheduling information is put, and then obtains the position of the PDCCH by performing blind detection through a G-RNTI.

It is judged whether checking through a CRC scrambled by the G-RNTI succeeds, if yes, it is illustrated that what is required is the frequency-domain scheduling information, and otherwise, blind detection on the PDCCH is continuously performed.

In Step 706, the UE reads frequency-domain scheduling information on the PDCCH.

The UE reads the frequency-domain scheduling information of the PDCCH on which blind detection succeeds.

In Step 707, the UE receives the MBMS on the basis of the frequency-domain scheduling information.

The UE receives the MBMS on the PDSCH according to the frequency-domain scheduling information on the PDCCH.

Embodiment 3

Figure 8:
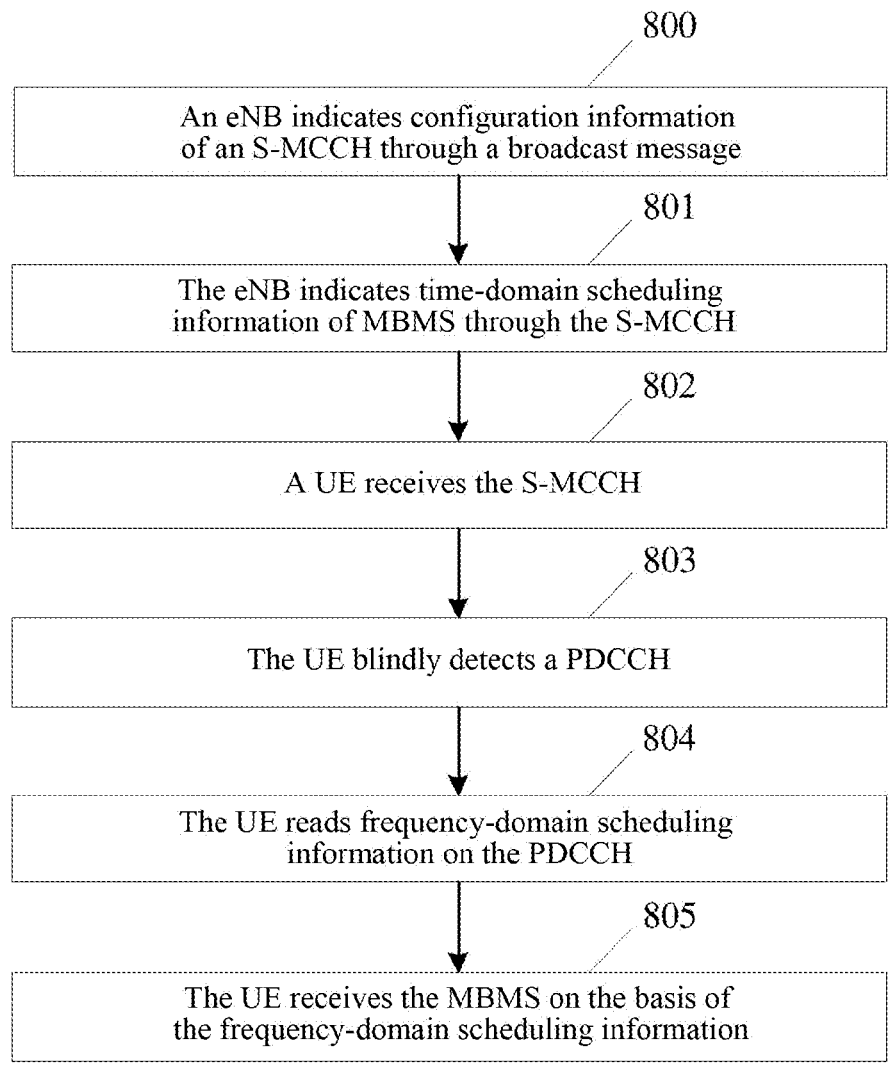
FIG. 8 is a flowchart of a method according to a third embodiment of the present disclosure.

Time-domain scheduling information of MBMS in Embodiment 3 is sent on an MSCH. FIG. 8 is a flowchart of a method according to a third embodiment of the present disclosure. As shown in FIG. 8, the method includes the steps 800-805 as follows.

In Step 800, an eNB indicates configuration information of an S-MCCH through a broadcast message. Herein, the broadcast message is an existing MBMS system message such as an SIB13 or an SIB15, the S-MCCH is an MCCH corresponding to a single cell, and the configuration information is position information about a subframe where S-MCCH information is located, such as a frame period and a subframe offset.

In Step 801, the eNB indicates time-domain scheduling information of MBMS through the S-MCCH.

The time-domain scheduling information at least includes: a TMGI of the MBMS, and time-domain position information about the TMGI. The time-domain position information at least includes: the position of a time-domain subframe where the MBMS is located, and a period of the time-domain subframe where the MBMS is located.

In Step 802, a UE receives the S-MCCH.

The UE indicates configuration information of the S-MCCH according to a broadcast message, the configuration information of the S-MCCH including: a frame period of an S-MCCH subframe, and/or an offset position of the subframe. The UE receives the S-MCCH according to the configuration information of the S-MCCH.

In Step 803, the UE blindly detects a PDCCH.

The UE determines a subframe where frequency-domain scheduling information is put according to the received S-MCCH, and then obtains the position of the PDCCH by performing blind detection through a G-RNTI.

It is judged whether checking through a CRC scrambled by the G-RNTI succeeds, if yes, it is illustrated that what is required is the frequency-domain scheduling information, and otherwise, blind detection on the PDCCH is continuously performed.

In Step 804, the UE reads frequency-domain scheduling information on the PDCCH.

The UE reads the frequency-domain scheduling information of the PDCCH on which blind detection succeeds.

In Step 805, the UE receives the MBMS on the basis of the frequency-domain scheduling information.

The UE receives the MBMS on a PDSCH according to the frequency-domain scheduling information on the PDCCH.

Those of ordinary skill in the art may understand that all or some of the steps of the above-mentioned embodiment may be implemented by using a computer program flow. The computer program may be stored in a computer-readable storage medium. The computer program is executed on a corresponding hardware platform (such as system, equipment, apparatus, and device). During execution, the computer program includes one of the steps of the method embodiment or a combination thereof.

Alternatively, all or some of the steps of the above-mentioned embodiment may also be implemented by using an integrated circuit. These steps may be manufactured into integrated circuit modules respectively, or multiple modules or steps therein are manufactured into a single integrated circuit module for implementing.

Apparatus/functional modules/function units in the above-mentioned embodiment may be implemented by using a general computation apparatus. They may be centralized on a single computation apparatus or may be distributed on a network composed of multiple computation apparatuses.

When apparatus/functional modules/function units in the above-mentioned embodiment are implemented in a form of a software function module and are sold or used as independent products, the products may also be stored in a computer-readable storage medium. The above-mentioned computer-readable storage medium may be a read-only memory, a magnetic disk or an optical disk.

INDUSTRIAL APPLICABILITY

According to the embodiments of the present disclosure, time-domain scheduling information is sent through an eNB, after receiving the time-domain scheduling information, a UE acquires frequency-domain scheduling information and receives MBMS according to the frequency-domain scheduling information, and a service scheduling method for transmitting MBMS in a single cell is provided.

What we claim is:

1. A method for implementing service scheduling, comprising:
    sending, by an evolved Node B, eNB, time-domain scheduling information of Single Cell-Point To Multipoint, SC-PTM, Multimedia Broadcast Multicast Service, MBMS, to User Equipment, UE, wherein
    the time-domain scheduling information is used for indicating a position of a time-domain subframe where the MBMS is located,
    a Physical Downlink Control Channel, PDCCH, of the time-domain subframe comprises frequency-domain scheduling information of the MBMS,
    a Cyclic Redundancy Check, CRC, of the PDCCH is scrambled by using a Radio Network Temporary Identifier, RNTI, corresponding to contents in a Physical Downlink Share Channel, PDSCH, and
    the MBMS is sent on the PDSCH.

2. The method according to claim 1, wherein the time-domain scheduling information is: MBMS Scheduling Channel, MSCH, information, or Multicast Channel, MCH, Scheduling Information, MSI, or Single cell-MBMS Control Channel, MCCH, S-MCCH, information.

3. The method according to claim 2, when the time-domain scheduling information is S-MCCH information, the method further comprising:
    putting the S-MCCH information on a PDSCH, and scrambling a PDCCH of a subframe where an S-MCCH is located by using a Group-RNTI, G-RNTI;
    multiplexing the S-MCCH and an S-MTCH in the same subframe or multiplexing the S-MCCH and the S-MTCH in different subframes; and
    putting the scrambled PDCCH in a common search space.

4. The method according to claim 3, further comprising:
    when the S-MCCH corresponds to a group RNTI, G-RNTI, indicating a correspondence between the G-RNTI and the S-MCCH through a broadcast message; or when the S-MCCH and the S-MTCH are multiplexed in the same subframe and correspond to the same G-RNTI, indicating the G-RNTI through a broadcast message; or when MBMS corresponds to different G-RNTIs, indicating a mapping relation between a Temporarily Mobile Group Identifier, TMGI, of the MBMS and a G-RNTI through the S-MCCH, wherein the broadcast message is a System Information Block, SIB, 13, a new SIB or an MCCH.

5. The method according to claim 4, further comprising:
when two or more S-MTCHs are multiplexed in the same subframe, or an S-MCCH and an S-MTCH are multiplexed, or an S-MTCH and a unicast service are multiplexed, identifying and distinguishing a different logical channel according to a Logical Channel Identifier, LCID in a subframe Media Access Control, MAC, header.

6. The method according to claim 1, wherein the position of the time-domain subframe comprises: a frame period where the time-domain subframe is located, and an offset of the time-domain subframe in the frame period.

7. The method according to claim 1, wherein
when the time-domain scheduling information is MSCH information, the method further comprises:
indicating, by the eNB, configuration information of the MSCH information through the S-MCCH, wherein the time-domain scheduling information is put on the MSCH;
when the time-domain scheduling information is MSI, the method further comprises:
indicating, by the eNB, configuration information of an MAC Control Element, CE, where the MSI is located through the S-MCCH, wherein the time-domain scheduling information is put on the MAC CE;
when the time-domain scheduling information is S-MCCH information, the method further comprises:
indicating, by the eNB, configuration information of the S-MCCH information through a system broadcast message SIB or an MCCH,
wherein
the configuration information of the MSCH information comprises: an offset position of a subframe where the MSCH information is located, and a frame period of the subframe where the MSCH information is located,
the configuration information of the MAC CE comprises: an offset position of a subframe where the MAC CE is located, and a frame period of the subframe where the MAC CE is located, and
the configuration information of the S-MCCH information comprises: a frame period of a subframe where the S-MCCH information is located, and an offset position of the subframe where the S-MCCH information is located.

8. The method according to claim 1, wherein the frequency-domain scheduling information is put into Downlink Control Information, DCI, of the PDCCH, and
the frequency-domain scheduling information comprises: an initial position of the MBMS in a frequency domain and a number of occupied Resource Blocks, RBs.

9. A computer-readable storage medium, with A non-transitory computer-readable storage medium, in which computer-executable instructions are stored and are used to execute the method according to claim 1.

10. A method for implementing service scheduling, comprising:

receiving, by User Equipment, UE, time-domain scheduling information, performing blind detection at a position of a time-domain subframe indicated by the time-domain scheduling information, determining a Physical Downlink Control Channel, PDCCH, comprising frequency-domain scheduling information of Multimedia Broadcast Multicast Service, MBMS, and reading the frequency-domain scheduling information on the PDCCH; and receiving, by the UE, the MBMS on a Physical Downlink Share Channel, PDSCH, based on the read frequency-domain scheduling information.

11. The method according to claim 10, wherein
when the time-domain scheduling information is MBMS Scheduling Channel, MSCH, information, the method further comprises:
acquiring, by the UE, configuration information of an MSCH through indication of a Single cell-MBMS Control Channel, MCCH, S-MCCH, and receiving a corresponding MSCH at a position indicated by the configuration information of the MSCH;
when the time-domain scheduling information is Multicast Channel Scheduling Information, MSI, the method further comprises:
acquiring, by the UE, configuration information of an MAC Control Element, CE, through indication of an S-MCCH, and receiving a corresponding MSI at a position indicated by the configuration information of the MAC CE;
when the time-domain scheduling information is S-MCCH information, the method further comprises:
acquiring, by the UE, configuration information of the S-MCCH information through indication of a system broadcast message SIB or an MCCH, and reading the S-MCCH information according to the configuration information of the S-MCCH information,
wherein
the configuration information of the MSCH information comprises: an offset position of a subframe where the MSCH information is located, and a frame period of the subframe where the MSCH information is located,
the configuration information of the MAC CE comprises: an offset position of a subframe where the MAC CE is located, and a frame period of the subframe where the MAC CE is located, and
the configuration information of the S-MCCH information comprises: a frame period of a subframe where the S-MCCH information is located, and an offset position of the subframe where the S-MCCH information is located.

12. The method according to claim 10, wherein reading the frequency-domain scheduling information comprises:
receiving, by the UE, a subframe at the position of the time-domain subframe indicated by the time-domain scheduling information, performing blind detection on a PDCCH of the subframe at the indicated position of the time-domain subframe, and determining that the blind detection on the PDCCH for putting the frequency-domain scheduling information succeeds,
wherein the blind detection is: scrambling a Cyclic Redundancy Check, CRC, bit of the received PDCCH by using a Group-Radio Network Temporary Identifier, G-RNTI, and checking scrambled information, when the check is correct, the blind detection succeeds.

13. The method according to claim 10, wherein
the UE is a UE having a Single Cell-Point To Multipoint, SC-PTM, receiving capability and interested in receiving the MBMS.

14. A computer-readable storage medium, with A non-transitory computer-readable storage medium, in which computer-executable instructions are stored and are used to execute the method according to claim 10.

15. An evolved Node B, eNB, for implementing service scheduling, comprising a sending unit, configured to: send time-domain scheduling information of Single Cell-Point To Multipoint, SC-PTM, Multimedia Broadcast Multicast Service, MBMS, to User Equipment, UE, wherein
the time-domain scheduling information is used for indicating a position of a time-domain subframe where the MBMS is located,
a Physical Downlink Control Channel, PDCCH, of the time-domain subframe comprises frequency-domain scheduling information of the MBMS,
a Cyclic Redundancy Check, CRC, of the PDCCH is scrambled by using a Radio Network Temporary Identifier, RNTI, corresponding to contents in a Physical Downlink Share Channel, PDSCH, and
the MBMS is sent on the PDSCH.

* * * * *